(12) United States Patent
Stueven et al.

(10) Patent No.: US 8,789,774 B2
(45) Date of Patent: Jul. 29, 2014

(54) METHOD FOR PRODUCING WATER-ABSORBING POLYMER PARTICLES

(75) Inventors: Uwe Stueven, Bad Soden (DE); Rüdiger Funk, Niedernhausen (DE); Matthias Weismantel, Jossgrund-Oberndorf (DE); Dominicus van Esbroeck, Nanjing (CN); Ronny De Kaey, Mortsel (BE)

(73) Assignee: BASF SE, Ludwigshafen (DE)

( * ) Notice: Subject to any disclaimer, the term of this patent is extended or adjusted under 35 U.S.C. 154(b) by 419 days.

(21) Appl. No.: 13/319,549

(22) PCT Filed: Jun. 1, 2010

(86) PCT No.: PCT/EP2010/057611
§ 371 (c)(1),
(2), (4) Date: Nov. 9, 2011

(87) PCT Pub. No.: WO2010/139680
PCT Pub. Date: Dec. 9, 2010

(65) Prior Publication Data
US 2012/0048973 A1  Mar. 1, 2012

(30) Foreign Application Priority Data
Jun. 3, 2009 (EP) .................................... 09161781

(51) Int. Cl.
*B02C 19/00* (2006.01)
*B02C 23/08* (2006.01)

(52) U.S. Cl.
USPC .................................. 241/18; 241/21; 241/23

(58) Field of Classification Search
USPC ........................ 241/18, 21, 23, 30; 526/317.1
See application file for complete search history.

(56) References Cited

U.S. PATENT DOCUMENTS

| 6,817,557 | B2 * | 11/2004 | Kakita et al. ..................... 241/23 |
| 8,329,844 | B2 * | 12/2012 | Weismantel et al. ......  526/317.1 |
| 2008/0214749 | A1 | 9/2008 | Weismantel et al. |
| 2010/0041549 | A1 | 2/2010 | Weismantel et al. |

FOREIGN PATENT DOCUMENTS

| DE | 10 2005 014291 A1 | 9/2006 |
| WO | WO-2008/087114 A1 | 7/2008 |

OTHER PUBLICATIONS

Buchholz, Fredric L., et al.. Modern Superabsorbent Polymer Technology, "Commercial Processes for the Manufacture of Superabsorbent Polymers," pp. 71-103. New York: John Wiley & Sons, Inc., 1998.
International Search Report in international application No. PCT/EP2010/057611, dated Feb. 23, 2011 (English translation).

\* cited by examiner

*Primary Examiner* — Mark Rosenbaum
(74) *Attorney, Agent, or Firm* — Marshall, Gerstein & Borun LLP

(57) ABSTRACT

A process for producing water-absorbing polymer particles, wherein an aqueous polymer gel is applied by means of a swivel belt to the conveyor belt of a forced-air belt drier, and the swivel belt, proceeding from one end position, is accelerated through a first pivot angle to an angular speed $v_1$, decelerated through a second pivot angle to an angular speed $v_2$ and decelerated through a third pivot angle to the other end position.

10 Claims, 1 Drawing Sheet

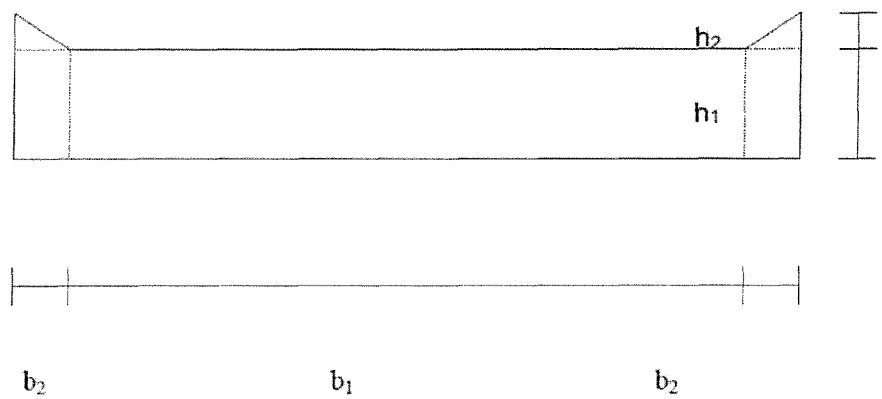

METHOD FOR PRODUCING WATER-ABSORBING POLYMER PARTICLES

CROSS-REFERENCE TO RELATED APPLICATIONS

This is the U.S. national phase application of International Application No. PCT/EP2010/057611, filed Jun. 1, 2010, which claims the benefit of European patent application No. 09161781.1, filed Jun. 3, 2009.

The present invention relates to a process for producing water-absorbing polymer particles, wherein an aqueous polymer gel is applied by means of a swivel belt to the conveyor belt of a forced-air belt drier.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

Water-absorbing polymer particles are typically obtained by polymerizing suitable aqueous monomer solutions or suspensions.

The properties of the water-absorbing polymer particles can be adjusted, for example, via the amount of crosslinker used. With increasing amount of crosslinker, the centrifuge retention capacity (CRC) falls and the absorption under a pressure of 21.0 g/cm$^2$ (AUL0.3 psi) passes through a maximum.

The aqueous polymer gels obtained by polymerization are typically dried by means of a forced-air belt drier. Especially in the case of forced-air belt driers with broad conveyor belts, it is difficult to ensure the necessary homogeneous coverage of the conveyor belt with the aqueous polymer gel. To solve this problem, for example, Research Disclosure RD 37327 proposes a specific application system, and Research Disclosure RD 37441 the use of rakes.

To improve the performance properties, for example, permeability of the swollen gel bed (SFC) in the diaper and absorption under a pressure of 49.2 g/cm$^2$ (AUL0.7 psi), water-absorbing polymer particles are generally surface postcrosslinked. This increases the crosslinking of the particle surface, which can at least partly decouple the absorption under a pressure of 49.2 g/cm$^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

It was an object of the present invention to provide an improved process for drying aqueous polymer gels on a forced-air belt drier, especially processes which lead to more homogeneous drying and to less product damage.

The object is achieved by a process for producing water-absorbing polymer particles by polymerizing a monomer solution or suspension comprising a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers mentioned under a) and
e) optionally one or more water-soluble polymers, comprising drying of the resulting aqueous polymer gel on a forced-air belt drier, grinding, classifying and optionally thermal surface postcrosslinking, wherein the aqueous polymer gel is applied by means of a swivel belt to the conveyor belt of the forced-air belt drier, the swivel belt, proceeding from one end position, is accelerated through a first pivot angle $\beta_1$ where $\beta_1$ is from 8 to 24° to an angular speed $v_1$, decelerated through a second pivot angle $\beta_2$ where $\beta_2$ is from 10 to 40° to an angular speed $v_2$ and decelerated through a third pivot angle $\beta_3$ to the other end position, the quotient of angular speed $v_2$ and angular speed $v_1$ being from 0.3 to 0.9, and the quotient of length of the swivel belt and width of the conveyor belt of the forced-air belt drier being 0.7 to 1.9, the length of the swivel belt being the distance of the pivot axis from the discharge end.

The first pivot angle $\beta_1$ is preferably from 9 to 21°, more preferably from 10 to 18°, very particularly from 11 to 15°. The angular speed $v_1$ is preferably 25 to 40°/s, more preferably from 28 to 37°/s, most preferably from 30 to 35°/s.

The second pivot angle $\beta_2$ is preferably from 13 to 32°, more preferably from 16 to 26°, very particularly from 18 to 22°. The angular speed $v_2$ is preferably 10 to 25°/s, more preferably from 13 to 22°/s, most preferably from 15 to 20°/s.

The total pivot angle, i.e. the sum of the first, second and third pivot angles, is preferably from 30 to 70°, more preferably from 40 to 60°, most preferably from 45 to 55°.

The quotient of angular speed $v_2$ and angular speed $v_1$ is preferably from 0.4 to 0.8, more preferably from 0.45 to 0.7, most preferably from 0.5 to 0.6.

The quotient of length of the swivel belt and width of the conveyor belt of the forced-air belt drier is preferably from 0.8 to 1.6, more preferably from 0.85 to 1.4, most preferably from 0.95 to 1.2.

When the swivel belt is not decelerated in the region of the second pivot angle $\beta_2$, i.e. $v_1$ is equal to $v_2$, the polymer gel bed on the conveyor belt of the forced-air belt drier is too high at the edges and too low in the middle. When the swivel belt is decelerated too greatly in the region of the second pivot angle $\beta_2$, i.e. $v_1$ is very much greater than $v_2$, the polymer gel bed on the conveyor belt of the forced-air belt drier is too low at the edges and too high in the middle.

The quotient of effective width of the forced-air belt drier and effective width of the swivel belt is preferably from 4 to 12, more preferably from 6 to 10, most preferably from 7 to 9. Too low an effective width of the swivel belt makes it more difficult to distribute the aqueous polymer gel homogeneously. The effective width of the forced-air belt drier or of the swivel belt is the width of the particular conveyor belt, which is laden with aqueous polymer gel.

The conveyor belt speed of the forced-air belt drier is preferably from 0.005 to 0.05 m/s, more preferably from 0.01 to 0.35 m/s, most preferably from 0.015 to 0.025 m/s.

Advantageously, the pivoting motion of the swivel belt and the conveyor belt speed of the forced-air belt drier are matched to one another such that the conveyor belt of the forced-air belt drier moves on by 0.1 to 0.2 m within a double pass of the swivel belt, a double pass meaning the movement of the swivel belt from the first end position to the other end position and back.

The pivot axis of the swivel belt is typically on the line which divides the conveyor belt of the forced-air belt drier longitudinally into two equal halves.

The process according to the invention enables, in a simple manner, homogenous drying of the aqueous polymer gel, and prevents product damage. More particularly a reduction in the crosslinking and the associated rise in centrifuge retention capacity (CRC) and extractables are prevented.

The water content of the polymer gel before the drying on the forced-air belt drier is preferably from 25 to 90% by weight, more preferably from 35 to 70% by weight, most preferably from 40 to 60% by weight.

The water content of the polymer gel after the drying on the forced-air belt drier is preferably from 0.5 to 15% by weight, more preferably from 1 to 10% by weight, most preferably from 2 to 8% by weight.

The height of the polymer gel bed on the conveyor belt of the forced-air belt drier in the application zone is preferably from 2 to 20 cm, more preferably from 5 to 15 cm, most preferably from 8 to 12 cm.

The vertical distance between swivel belt and conveyor belt of the forced-air belt drier, i.e. the height from which the aqueous polymer gel falls onto the conveyor belt, is preferably from 0.1 to 2 m, more preferably from 0.3 to 1.5 m, most preferably from 0.5 to 1 m. At too great a fall height the aqueous polymer gel becomes too highly compacted and the flow through it becomes poorer.

The conveyor belt speed of the swivel belt is preferably from 0.2 to 2 m/s, more preferably from 0.4 to 1.5 m/s, most preferably from 0.5 to 1 m/s.

The aqueous polymer gel shrinks during the drying. This leads to the effect that the aqueous polymer gel draws back from the outermost edge regions of the conveyor belt during drying. The consequence of this is that a portion of the drying gas flows past the polymer gel bed instead of flowing through it.

This shrinkage effect can be compensated for by a slightly higher loading of the outermost edge regions of the conveyor belt. The optimal cross section of a polymer gel bed is shown in FIG. 1, where $b_1$ is the width of the middle region,
$b_2$ is the width of the outermost edge region,
$h_1$ is the height in the middle region and
$h_2$ is the elevation at the outermost edge.

The width $b_1$ of the middle region is preferably from 75 to 95%, more preferably from 80 to 90%, most preferably from 83 to 87%, of the total width of the conveyor belt of the forced-air belt drier. The elevation $h_2$ is preferably 10 to 40%, more preferably from 15 to 35%, most preferably from 20 to 30%, of the height $h_1$.

The water content of the polymer gel bed in the application zone is preferably from 25 to 90% by weight, more preferably from 35 to 70% by weight, most preferably from 40 to 60% by weight. The mean particle size of the aqueous polymer gel is preferably from 0.1 to 10 mm, more preferably from 0.5 to 5 mm, most preferably from 1 to 2 mm.

The gas stream used for drying may comprise water vapor. However, the water vapor content should not exceed a value that corresponds to a dew point of preferably at most 50° C., more preferably at most 40° C., most preferably at most 30° C.

The gas inlet temperatures of the forced-air belt drier are preferably from 150 to 200° C., more preferably from 160 to 190° C., most preferably from 170 to 180° C.

The residence time on the forced-air belt drier is preferably from 10 to 120 minutes, more preferably from 20 to 90 minutes, most preferably from 30 to 60 minutes.

The effective width of the forced-air belt drier is preferably from 1 to 10 m, more preferably from 2 to 7.5 m, most preferably from 3 to 5 m.

The effective length of the forced-air belt drier is preferably from 10 to 80 m, more preferably from 30 to 60 m, most preferably from 40 to 50 m.

A particularly advantageous drying process is described in WO 2001/100300 A1.

The production of the water-absorbing polymer particles is described in detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1. EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm$^2$ (AUL0.3 psi) passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the aqueous polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms an aqueous polymer gel, which has to be comminuted in a further process step, for example in an extruder or kneader.

To improve the drying properties, the comminuted aqueous polymer gel obtained by means of a kneader can additionally be extruded.

The acid groups of the resulting aqueous polymer gels have typically been partially neutralized. Neutralization is preferably carried out at the monomer stage. This is typically done by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the aqueous polymer gel formed in the polymerization. It is also possible to neutralize up to 40 mol %, preferably 10 to 30 mol % and more preferably 15 to 25 mol % of the acid groups before the polymerization by adding a portion of the neutralizing agent actually to the monomer solution and setting the desired final degree of neutralization only after the polymerization, at the aqueous polymer gel stage. When the aqueous polymer gel is neutralized at least partly after the polymerization, the aqueous polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The aqueous polymer gel is then dried with a forced-air belt drier until the residual moisture content is preferably 0.5 to 15% by weight, more preferably 1 to 10% by weight and most preferably 2 to 8% by weight, the residual moisture content being determined by the EDANA (European Disposables and Nonwovens Association) recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 μm, more preferably from 250 to 600 μm and very particularly from 300 to 500 μm. The mean particle size of the product fraction may be determined by means of the EDANA (European Disposables and Nonwovens Association) recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight, most preferably at least 98% by weight.

Polymer particles with too small a particle size lower the permeability (SFC). The proportion of excessively small polymer particles ("fines") should therefore be small.

Excessively small polymer particles are therefore typically removed and recycled into the process. This is preferably done before, during or immediately after the polymerization, i.e. before the drying of the aqueous polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until in an apparatus connected downstream of the polymerization reactor, for example to an extruder, the excessively small polymer particles can be incorporated into the resulting aqueous polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of at most 600 μm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidone and its derivatives, such as 2-hydroxyethyl-2-oxazolidone in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1 bicyclic amide acetals in DE 103 34 584 A1. oxetanes and cyclic ureas in EP 1 199 327 A2 and morpholine-2,3-dione and its derivatives in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 138 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium, Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either during or after the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The temperature of the water-absorbing polymer particles in the drier is preferably from 100 to 250° C., more preferably from 130 to 220° C., most preferably from 150 to 200° C. The residence time in the drier is preferably from 10 to 120 minutes, more preferably from 10 to 90 minutes, most preferably from 30 to 60 minutes. The fill level of the drier is preferably from 30 to 80%, more preferably from 40 to 75%, most preferably from 50 to 70%. The fill level of the drier can be adjusted via the height of the overflow weir.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is carried out preferably at 30 to 80° C., more preferably at 35 to 70° C. and most preferably at 40 to 60° C. At excessively low temperatures, the water-absorbing polymer particles tend to form lumps, and, at higher temperatures, water already evaporates noticeably. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 0.2 to 10% by weight and most preferably 0.5 to 8% by weight, the moisture content being determined by EDANA (European Disposables and Nonwovens Association) recommended test method No. WSP 230.2-05 "Moisture Content".

The water-absorbing polymer particles produced by the process according to the invention have a centrifuge retention capacity (CRC) of typically at least 15 g/g, preferably at least 20 g/g, preferentially at least 22 g/g, more preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA (European Disposables and Nonwovens Association) recommended test method No. WSP 241.2-05 "Centrifuge Retention Capacity".

The water-absorbing polymer particles are tested by means of the test methods described below.

Methods:

The measurements should, unless stated otherwise, be carried out at an ambient temperature of 23±2° C. and a relative air humidity of 50±10%. The water-absorbing polymer particles are mixed thoroughly before the measurement.

Centrifuge Retention Capacity

The centrifuge retention capacity (CRC) is determined by EDANA recommended test method No. WSP 241.2-05 "Centrifuge Retention Capacity".

Extractables

The extractables are determined by EDANA recommended test method No. WSP 270.2-05 "Extractable".

The EDANA test methods are obtainable for example, from EDANA, Avenue Eugene Plasky 157, B-1030 Brussels, Belgium.

EXAMPLES

Example 1

By continuously mixing deionized water, 50% by weight sodium hydroxide solution and acrylic acid, an acrylic acid/sodium acrylate solution was prepared such that the degree of neutralization corresponded to 71.3 mol %. The solids content of the monomer solution was 38.8% by weight.

The polyethylenically unsaturated crosslinker used was polyethylene glycol-400 diacrylate (diacrylate proceeding from a polyethylene glycol with a mean molar mass of 400 g/mol). The amount used was 2 kg of crosslinker per t of monomer solution.

To initiate the free-radical polymerization, per t of monomer solution, 1.03 kg of a 0.25% by weight aqueous hydrogen peroxide solution, 3.10 kg of a 15% by weight aqueous sodium peroxodisulfate solution and 1.05 kg of a 1% by weight aqueous ascorbic acid solution were used.

The throughput of the monomer solution was 20 t/h. The reaction solution had a feed temperature of 23.5° C.

The individual components were metered in the following amounts continuously into a List Contikneter continuous kneader reactor with a capacity of 6.3 m³ (LIST AG, Arisdorf, Switzerland):

| | |
|---|---|
| 20 t/h | of monomer solution |
| 40 kg/h | of polyethylene glycol 400 diacrylate |
| 82.6 kg/h | of hydrogen peroxide solution/sodium peroxodisulfate solution |
| 21 kg/h | of ascorbic acid solution |

Between the addition point for the crosslinker and the addition sites for the initiators, the monomer solution was inertized with nitrogen.

After approx. 50% of the residence time there was an additional metered addition of fines (1000 kg/h) which were obtained from the production process by grinding and sieving into the reactor. The residence time of the reaction mixture in the reactor was 15 minutes.

The resulting aqueous polymer gel was applied to a forced-air belt drier by means of a swivel belt.

The forced-air belt drier had an effective length of 48 m. The conveyor belt of the forced-air belt drier had an effective width of 4.4 m. The speed of the conveyor belt of the forced-air belt drier was 0.022 m/s.

The swivel belt had a length of 5 m. The conveyor belt of the swivel belt had a width of 0.8 m and an effective width of 0.5 m. The conveyor belt of the swivel belt was curved upward by approx. 20° at the edges. The angle of repose of the aqueous polymer gel on the conveyor belt of the swivel belt was approx. 15°. The cross section of the polymer gel bed on the conveyor belt of the swivel belt was approx. 0.04 m². The speed of the conveyor belt of the swivel belt was 0.5 m/s.

Proceeding from one end position, the swivel belt was accelerated through a first pivot angle $\beta_1$ of 13° to an angular speed of 33°/s, decelerated through a second pivot angle $\beta_2$ of 20° to an angular speed of 17°/s and decelerated through a third pivot angle $\beta_3$ to the other end position. The total pivot angle was 50°. A double pass (from the first end position to the other end position and back) lasted approx. 7 s.

The height of the polymer gel bed on the conveyor belt of the forced-air belt drier was determined with an Absolute® Digimatic digital scale (Mitutoyo Messgeräte GmbH, Neuss, Germany). The polymer gel bed on the conveyor belt of the forced-air belt drier had a profile according to FIG. 1, with a height $h_1$ of approx. 10 cm, a height $h_2$ of approx. 2.5 cm, a width $b_1$ of approx. 376 cm and a width $b_2$ of approx. 32 cm.

On the forced-air belt drier, an air/gas mixture flowed continuously around the aqueous polymer gel and dried it. The residence time in the forced-air belt drier was 37 minutes.

The dried polymer gel was ground and sieved to a particle size fraction of 150 to 850 μm.

The resulting water-absorbing polymer particles had a centrifuge retention capacity (CRC) of 34.9 g/g and an extractables content of 8.5% by weight.

Example 2 (Comparative Example)

The procedure was as in example 1. Proceeding from one end position, the swivel belt was accelerated through a first pivot angle $\beta_1$ of 13° to an angular speed of 24°/s, kept at a constant angular speed of 24°/s through a second pivot angle $\beta_2$ of 20° and decelerated to the other end position through a third pivot angle $\beta_3$. The total pivot angle was 50°.

The resulting water-absorbing polymer particles had a centrifuge retention capacity (CRC) of 44.9 g/g and an extractables content of 17.4% by weight.

Example 3 (Comparative Example)

The procedure was as in example 1. Proceeding from one end position, the swivel belt was accelerated through a first pivot angle $\beta_1$ of 13° to an angular speed of 24°/s, decelerated through a second pivot angle $\beta_2$ of 20° to an angular speed of 22°/s and decelerated through a third pivot angle $\beta_3$ to the other end position. The total pivot angle was 50°.

The resulting water-absorbing polymer particles had a centrifuge retention capacity (CRC) of 40.7 g/g and an extractables content of 8.7% by weight.

Example 4 (Comparative Example)

The procedure was as in example 1. Proceeding from one end position, the swivel belt was accelerated through a first pivot angle $\beta_1$ of 13° to an angular speed of 40°/s, decelerated through a second pivot angle $\beta_2$ of 20° to an angular speed of 15°/s and decelerated through a third pivot angle $\beta_3$ to the other end position. The total pivot angle was 50°.

During the drying on the conveyor belt of the forced-air belt drier, the aqueous polymer gel shrank such that the edges of the conveyor belt were no longer covered.

The invention claimed is:

1. A process for producing water-absorbing polymer particles by polymerizing an aqueous monomer solution or suspension comprising
    a) at least one ethylenically unsaturated monomer which bears an acid group and may be at least partly neutralized,
    b) at least one crosslinker,
    c) at least one initiator,
    d) optionally one or more ethylenically unsaturated monomer copolymerizable with the monomer mentioned under a) and
    e) optionally one or more water-soluble polymer, comprising drying the resulting aqueous polymer gel on a forced-air belt drier, grinding, classifying, and optionally thermal surface postcrosslinking, wherein the aqueous polymer gel is applied by means of a swivel belt to the conveyor belt of the forced-air belt drier, the swivel belt, proceeding from one end position, is accelerated through a first pivot angle $\beta_1$ where $\beta_1$ is from 8 to 24° to an angular speed $v_1$, decelerated through a second pivot angle $\beta_2$ where $\beta_2$ is from 10 to 40° to an angular speed $v_2$, and decelerated through a third pivot angle $\beta_3$ to the other end position, a quotient of angular speed $v_2$ and angular speed $v_1$ being from 0.3 to 0.9, and a quotient of length of the swivel belt and width of the conveyor belt of the forced-air belt drier being 0.7 to 1.9, the length of the swivel belt being the distance of the pivot axis from a discharge end.

2. The process according to claim 1, wherein a total pivot angle is from 30 to 70°.

3. The process according to claim 1, wherein the angular speed $v_1$ is from 25 to 40°/s.

4. The process according to claim 1, wherein a quotient of effective width of the forced-air belt drier and effective width of the swivel belt is from 4 to 12.

5. The process according to claim 1, wherein a conveyor belt speed of the forced-air belt drier is from 0.005 to 0.05 m/s.

6. The process according to claim 1, wherein a water content of the polymer gel before the drying on the forced-air belt drier is from 30 to 70% by weight.

7. The process according to claim 1, wherein the water content of the polymer gel after the drying on the forced-air belt drier is from 0.5 to 15% by weight.

8. The process according to claim 1, wherein a height of the polymer gel bed on the conveyor belt of the forced-air belt drier is from 2 to 20 cm.

9. The process according to claim 1, wherein the aqueous polymer gel to be dried falls from a height of 0.1 to 2 m onto the conveyor belt of the forced-air belt drier.

10. The process according to claim 1, wherein the water-absorbing polymer particles have a centrifuge retention capacity of at least 15 g/g.

\* \* \* \* \*